Sept. 6, 1955 R. B. HOPKINS 2,717,152
REVERSED SPRING SUSPENSION FOR VEHICLE BODIES
Filed Jan. 21, 1953 4 Sheets-Sheet 2

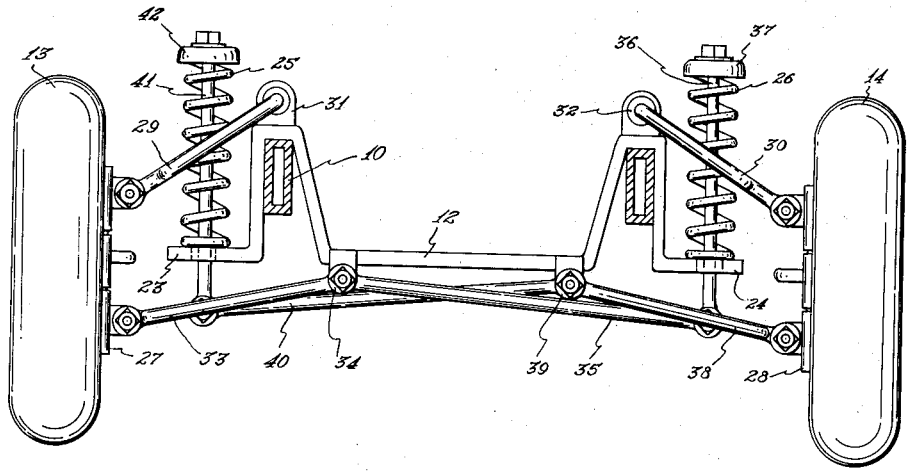

INVENTOR.
Roscoe B. Hopkins
BY
Fred Wells
Atty.

Sept. 6, 1955  R. B. HOPKINS  2,717,152
REVERSED SPRING SUSPENSION FOR VEHICLE BODIES
Filed Jan. 21, 1953  4 Sheets-Sheet 3
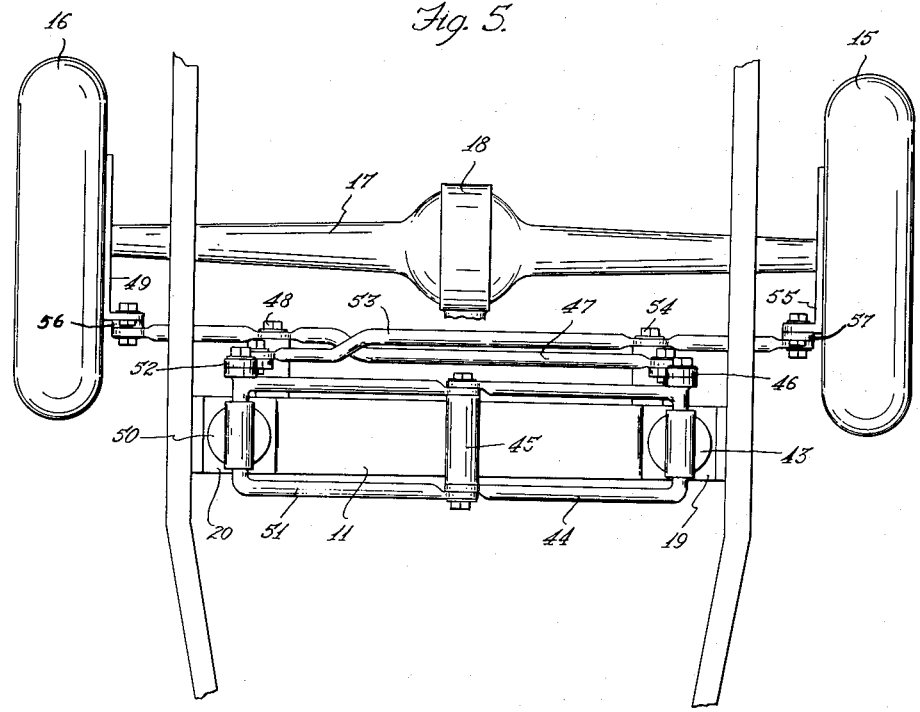
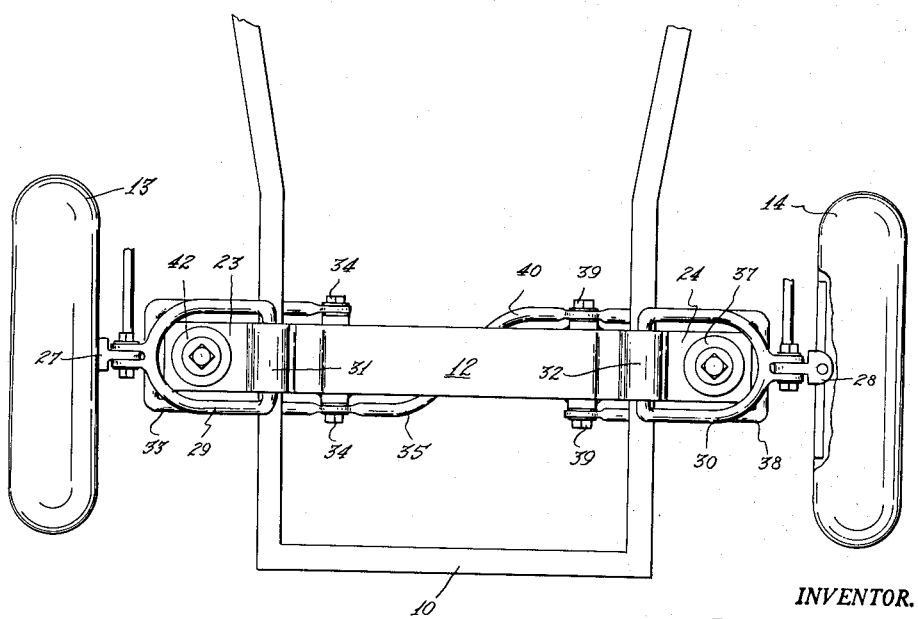
INVENTOR.
Roscoe B. Hopkins
BY
Greek Wells
Atty INVENTOR.
Roscoe B. Hopkins
BY
Atty.

United States Patent Office 2,717,152
Patented Sept. 6, 1955

2,717,152

REVERSED SPRING SUSPENSION FOR VEHICLE BODIES

Roscoe B. Hopkins, Lewiston, Idaho, assignor of one-half to Art L. Ketchum, Lewiston, Idaho Application January 21, 1953, Serial No. 332,161

1 Claim. (Cl. 267—20)

The present invention relates to improvements in a reversed spring suspension for vehicle bodies.

It is embodied in a conventional automobile construction wherein the body support frame of the vehicle is carried by the four road wheels in such a fashion that each wheel may rise and fall with respect to the body. The frame is connected to the individual front and rear wheels and link and lever arrangements that oppose tilting of the body in response to the rise and fall of the wheels.

It is the principal purpose of this invention to provide a novel mechanism to overcome the tendency of the vehicle body to tip due to centrifugal force when the vehicle is going around a curve. This mechanism embodies coiled springs, the lower ends of which rest on the frame. The springs have caps which are linked directly to the free ends of the supporting levers. The detailed operation of the suspension mechanism will be more apparent from the following detailed description and the accompanying drawings illustrating a preferred embodiment of the invention. It should be understood, however, that the drawings and description are illustrative only and are not intended to limit the invention except insofar as it is limited by the claim.

In the drawings:

Figure 1 is a front view with part of the vehicle frame broken away, illustrating my invention as applied to the suspension of the front end of the vehicle body on the front wheels of an automobile;

Figure 2 is a bottom plan view looking upward at Figure 1;

Figure 5 is a view partly broken away, looking down on the vehicle embodying the front and rear wheel suspension mechanisms shown in Figures 1 to 4;

Figure 3:
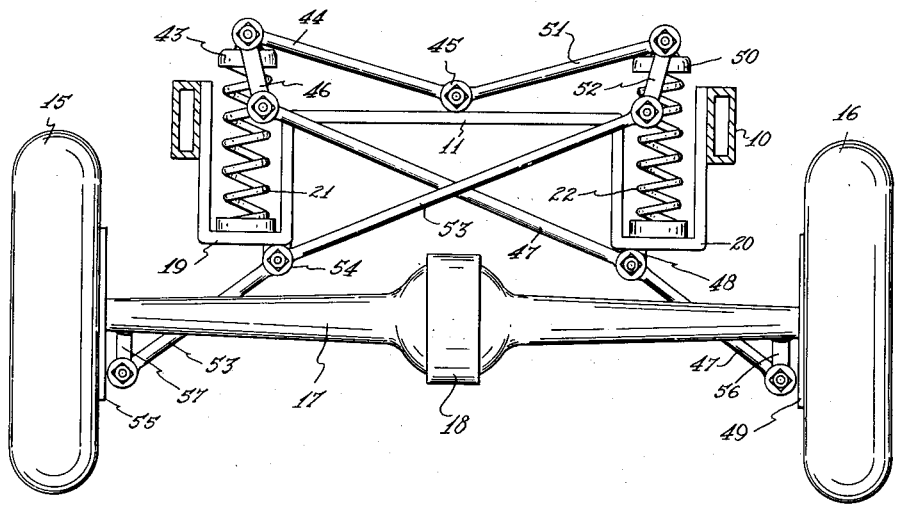
Figure 3 is a rear view, showing the suspension of the vehicle body on the rear wheels of an automobile.

Referring now to the drawings, in Figure 1, only the front wheel suspension is illustrated, the rear wheel suspension being left out for the sake of clearness. Likewise in Figure 3, the front wheel suspension has been left out for the sake of clearness. The body supporting frame 10 of the vehicle is suitably cross braced and two cross braces 11 and 12 of the frame 10 are utilized as part of the wheel suspension. The front wheels 13 and 14 carry the front end of the frame 10. Rear wheels 15 and 16 carry the rear end of the frame 10. The rear wheels 15 and 16 are connected by the usual rear axle assembly 17 with its differential gear unit 18. No attempt has been made to show the drive mechanism or the steering mechanism for the wheel assemblies since these are conventional.

The rear cross brace 11 includes two spring support platforms 19 and 20 which mount coiled springs 21 and 22. The front cross frame member 12 is extended over the frame 10 at both sides and is provided with spring supports 23 and 24 to support coiled springs 25 and 26. The link and lever mechanisms, by which the frame 10 is suspended on the wheels 13, 14, 15 and 16, are connected between the wheels, the frame members 11 and 12 and the springs 21, 22, 25 and 26.

Referring now in particular to Figures 1, 2 and 5, the front wheels 13 and 14 are connected through combined wheel mounts and steering unit assemblies 27 and 28 to upper links 29 and 30 that are pivoted in supports 31 and 32 on the cross frame member 12 directly over the frame 10. Wheel mount 27 is connected by a lower lever 33 to a support 34 on the cross frame 12. The lever 33 is extended at 35 to a point beneath the spring 26. A link 36 extends up from the free end of the lever arm 35 through the spring 26 and is supported on a spring cap 37 at the top of the spring 26. The wheel mount 28 is connected by a lever 38 to a support 39 on the cross frame 12 and is extended beyond the support 39 at 40. The free end of the lever arm 40 is connected by a link 41 to a cap 42 on the top of the spring 25.

Figure 4:
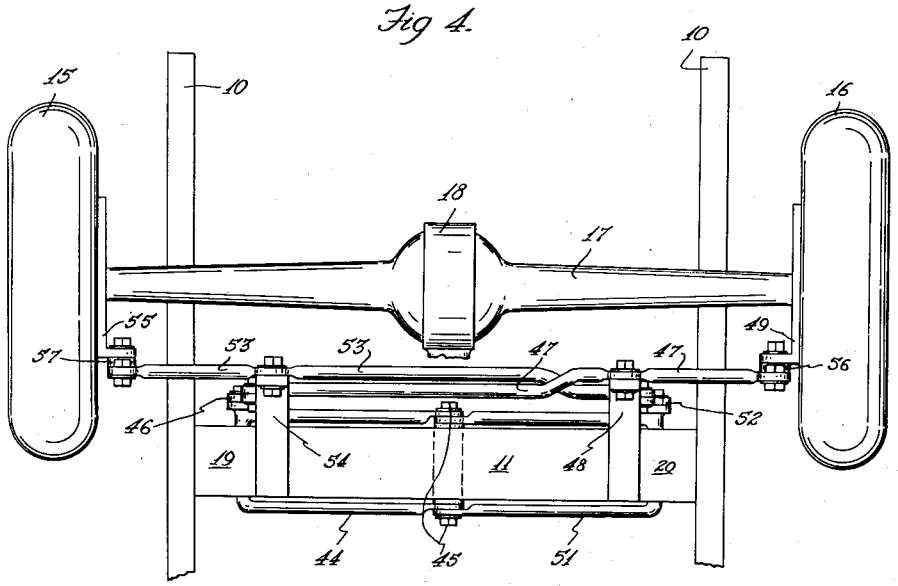
Figure 4 is a bottom plan view looking up at the construction shown in Figure 3.

Referring now to Figures 3, 4 and 5, the rear wheels 15 and 16 are supportingly connected to the frame 10 through the cross frame 11 by the following mechanism: A cap 43 on the top of the spring 21 is connected by a link 44 to a central mounting pin 45 at the center of the cross frame 11. A link 46 is pivoted to the link 44 and the cap 43, and is joined at its lower end to the free end of a lever 47. The lever 47 connects to the spring seat 20 by a support 48 and is suspended on the wheel mount 49 of the wheel 16 by a link 56. A wheel cap 50 on the spring 22 is connected by a link 51 to the central support 45. It is also connected by a link 52 to the free end of a supporting lever 53. The supporting lever 53 connects to the spring seat 19 by a support 54. The lever 53 is then suspended on the wheel mount 55 of the wheel 15 by a link 57. The links 56 and 57 provide for pivotal and swinging movement of the levers with respect to the wheel supports to compensate for the outward and inward movement of the lower ends of the levers 47 and 53 as the wheels rise and fall with respect to the frame.

Figure 6:
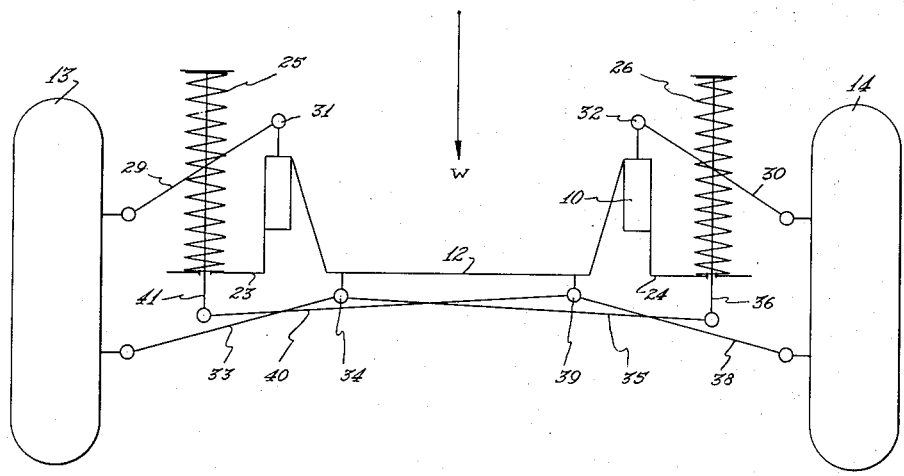
Figures 6 and 7 are somewhat diagrammatic views illustrating the reaction of the reversed spring suspension to centrifugal forces that are created by a car going around a curve.
Figure 7:
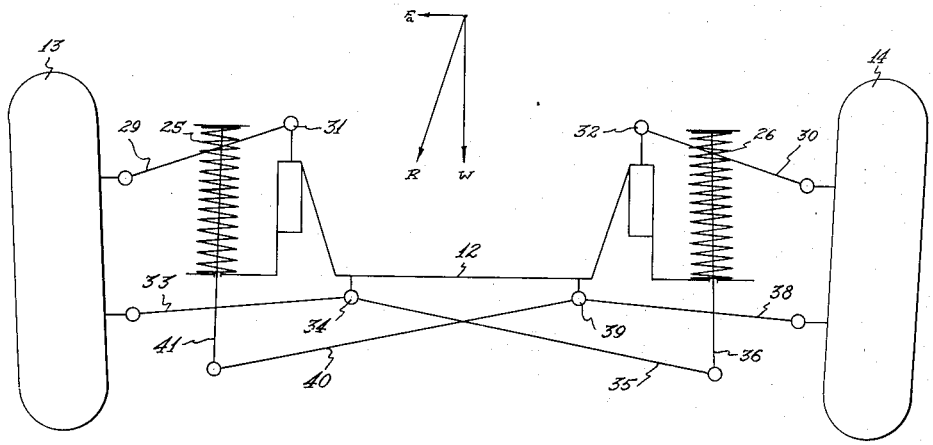

Referring now to Figures 1, 6 and 7, the operation of the wheel suspension hereinbefore described is as follows: It will be noted that the springs 25 and 26 on supports 23 and 24 which are really carried by the frame 10. If any force is applied which will tend to depress the left hand side of the frame 10, for example, centrifugal force due to the turning of the car in such a direction that the wheel 13 is on the outside of the curve, the action will be such as to prevent tilting of the frame 10. The depression of the frame 10 will lower the support 34. It will also tend to relieve the compression force of the spring 25. The lowering of the support 34 with respect to the wheel 13 causes the lever arm 35 to pull down on the link 36, compressing the spring 26 and exerting a downward force on the support 24 to oppose turning movement of the centrifugal force. This will tend to pull down the right hand side of the frame as shown in Figures 1, 6 and 7. At the same time the lowering of the left hand side of the frame 10 somewhat relieves the tension on the spring 25 so that the lever arm 40 can move down slightly to enable the support 39 to move down with respect to the wheel 14.

The net result of the centrifugal force on the left hand side of the frame 10 is therefore a settling of the entire frame 10 closer to the road, lowering the center of gravity of the vehicle body and lessening the tendency of the car to turn over. The reversed spring suspension for the springs 25 and 26 and the levers 33 and 38 connected to the springs, the frame and the wheels in the manner described, make this action possible. This construction provides substantially longer lever arms between the links 36 and 41 and their wheel mounts 27 and 28 than between the wheel mounts and the supports 34 and 39. The longer lever arm provides the extra movement of the links 36 and 41 to take up the compression and expansion of the springs in the right amounts and to enable a slight downward movement of one side of the frame to apply the necessary corrective force to bring the other side of the frame down accordingly.

The rear wheel suspension operates in essentially the same fashion as the front wheel suspension. For example, a centrifugal force tending to depress the right hand side of the frame 10, as shown in Figure 3, will be communicated through the connection 48 to the lever 47 so as to compress the spring 21. This will in turn lower the connection 54 to enable the lever 53 to follow the spring 22 down.

My reversed spring suspension permits individual wheel rise and fall that takes place when a wheel passes over a bump or depression with a minimum communication of this movement to the frame itself. The springs on both sides are utilized to absorb such movements.

It is believed that the nature and advantages of my invention will be clear from the foregoing description.

Having thus described my invention, I claim:

A wheel suspension to suspend a vehicle frame between two road wheels on their wheel mounts comprising a cross frame piece having a spring seat at each end, coiled springs on said seats, spring caps on said springs, links pivoted on the caps and pivoted to the frame to hold said springs upright in place, two oppositely disposed frame supporting levers, each having one end suspended by a link from one of the caps and the other end suspended by a link from the wheel mount most remote from that cap, and a frame supporting pivot on each lever adjacent to the wheel mount supported end thereof.

References Cited in the file of this patent

UNITED STATES PATENTS

| | | |
|---|---|---|
| 1,212,987 | Morrow | Jan. 16, 1917 |
| 2,043,889 | Erb | June 9, 1936 |
| 2,673,732 | Heston | Mar. 30, 1954 |

FOREIGN PATENTS

| | | |
|---|---|---|
| 267,836 | Switzerland | July 1, 1950 |
| 393,445 | Great Britain | June 8, 1933 |